United States Patent [19]

Chin

[11] Patent Number: 5,277,291

[45] Date of Patent: Jan. 11, 1994

[54] WASTE COLLECTING MACHINE WITH COIN REFUND MECHANISM

[76] Inventor: Chuan-Fu Chin, No. 118, Ming Sen St., San-Shya Chen, Taipei Hsien, Taiwan

[21] Appl. No.: 677,558

[22] Filed: Mar. 29, 1991

[51] Int. Cl.$^5$ .............................................. G07F 7/06
[52] U.S. Cl. .................................. 194/209; 194/343; 100/902
[58] Field of Search ............... 194/208, 209, 212, 213, 194/343; 100/902; 209/930

[56] References Cited

U.S. PATENT DOCUMENTS

| | | | |
|---|---|---|---|
| 4,214,654 | 7/1980 | Pryor et al. | 194/343 |
| 4,245,731 | 1/1981 | Herbst et al. | 194/209 |
| 4,995,314 | 2/1991 | Buer | 100/902 X |
| 5,042,634 | 8/1991 | Gulmini | 194/209 |

*Primary Examiner*—F. J. Bartuska
*Attorney, Agent, or Firm*—Lowe, Price, LeBlanc & Becker

[57] ABSTRACT

A waste collecting machine comprising a housing having two entrances for waste metal cans and glass bottles, a mechanical arm to collect and deliver waste metal cans or glass bottles into said entrances respectively, a roller ramming mechanism to crush waste metal cans out of shape, a metal detector to detect metal cans from glass bottles, an electromagnet controlled by said metal detector to shift a sub-slide way to the left or right according to detection result, a counting device to count the number of waste cans or glass bottles passing thereby, and a refund device to give coins in return for the waste cans or bottles received.

1 Claim, 4 Drawing Sheets

WASTE COLLECTING MACHINE WITH COIN REFUND MECHANISM

BACKGROUND OF THE INVENTION

The present invention relates to a waste collecting machine and more particularly to a waste collecting machine for collecting waste bottles and cans which has a roller ramming mechanism incorporated therein to ram collected waste bottles or cans into flat shape and a coin refund mechanism to automatically pay coins for the waste bottles or cans put therein.

In conventional waste reclamation operation, waste materials are classified by labor and respectively collected in separate containers for further treatment. Because material classification is made by labor, it requires much time to perform and error classification problem is difficult to eliminate. Because the containers for collecting waste materials and the waste materials to be classified are generally placed at different locations slightly far from one another, workers who classify waste materials and dispense classified waste materials into respective containers may carelessly put waste materials in wrong containers. Further, after classification, waste bottles and cans generally occupy much space for collection.

SUMMARY OF THE INVENTION

The present invention has been accomplished under the circumstances in view. It is therefore an object of the present invention to provide a waste collecting machine which has means to automatically classify metal and non-metal bottles and cans.

It is another object of the present invention to provide a waste collecting machine which has means to crush collected waste metal containers into flat shape so as to reduce space occupation.

It is still another object of the present invention to provide a waste collecting machine which has means to count the quantity of waste containers put therein, and means to pay coins for the waste containers collected.

BRIEF DESCRIPTION OF THE DRAWINGS

The present invention will now be described by way of example with reference to the annexed drawings, in which.

DETAILED DESCRIPTION OF THE DRAWINGS

Figure 1:
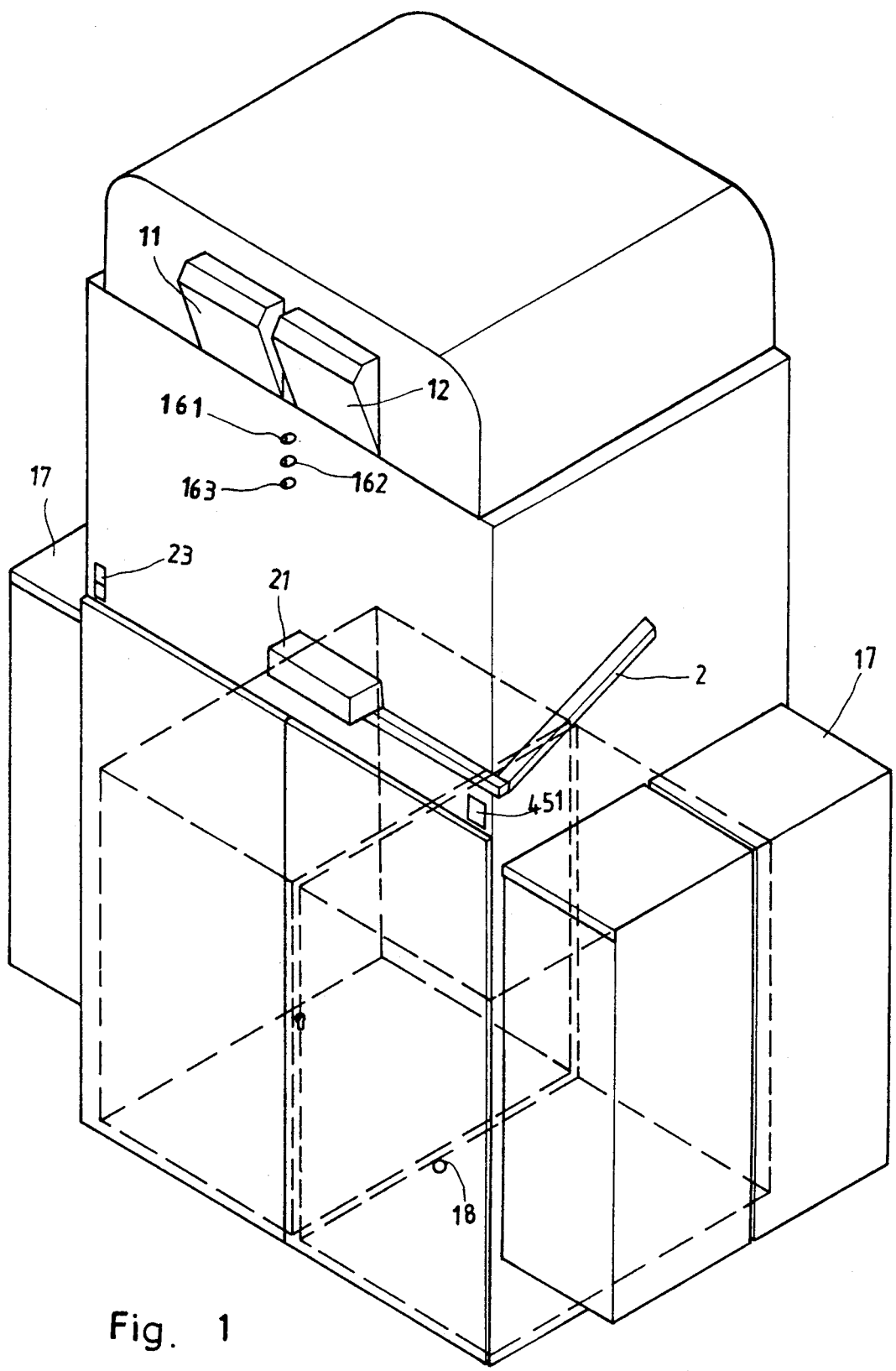
FIG. 1 is a perspective view of the preferred embodiment of the waste collecting machine of the present invention.
Figures 2, 3:
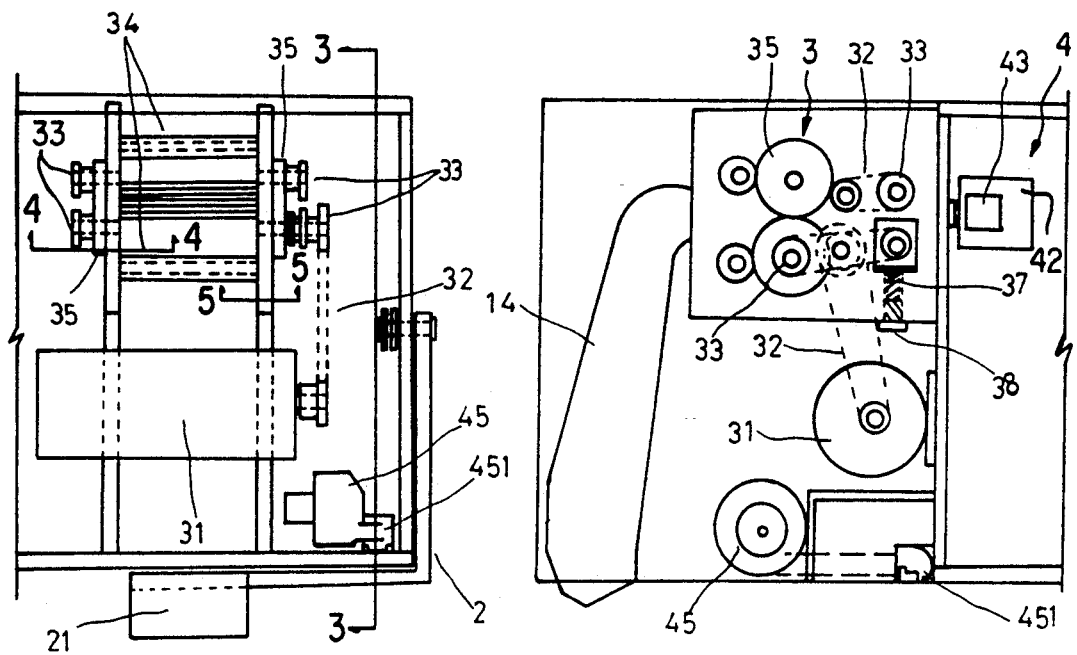
FIG. 2 is a fragmentary top view of the device of FIG. 1 having the upper portion removed to expose the roller ramming mechanism.
FIG. 3 is a fragmentary cross sectional view taken along lines 33 of FIG. 2.
Figures 4, 4A:
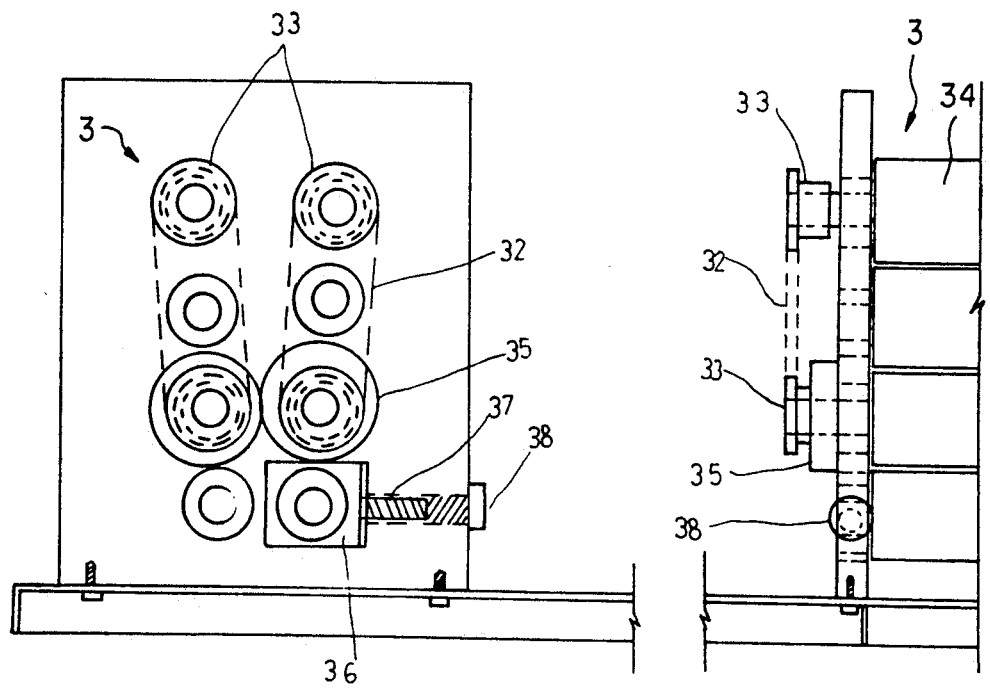
FIG. 4 is a fragmentary cross sectional view with the housing removed taken along lines 44 of FIG. 2.
FIG. 4A is a side view of FIG. 4.
Figure 5:
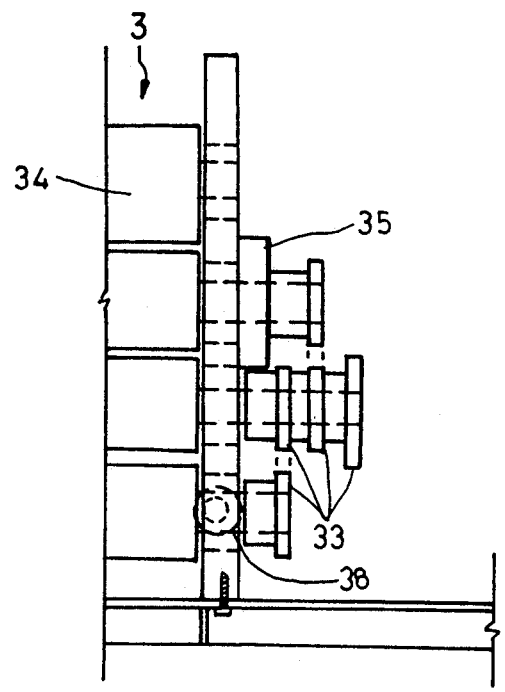
FIG. 5 is a fragmentary cross sectional view with the housing removed taken along lines 55 of FIG. 2.
Figure 5A:
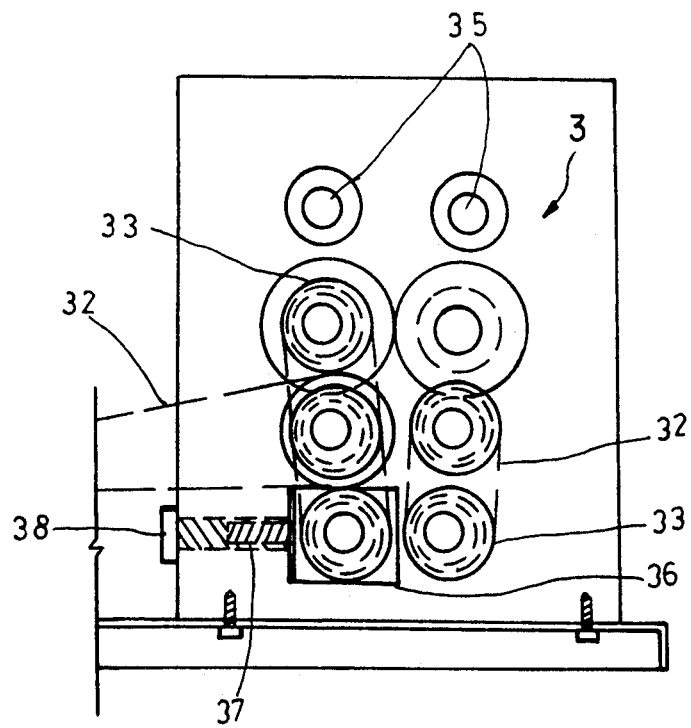
FIG. 5A is a side view of FIG. 5.
Figure 6:
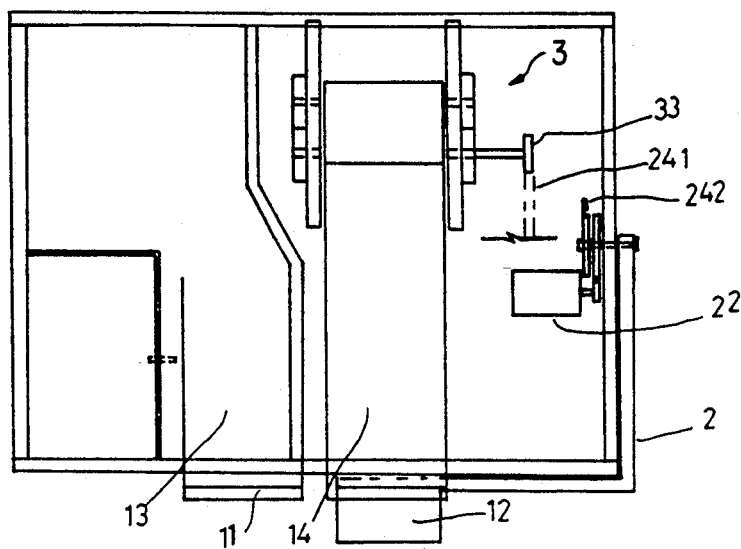
FIG. 6 is a top view of the device of this invention with the upper portion of the housing removed.
Figures 7, 8:
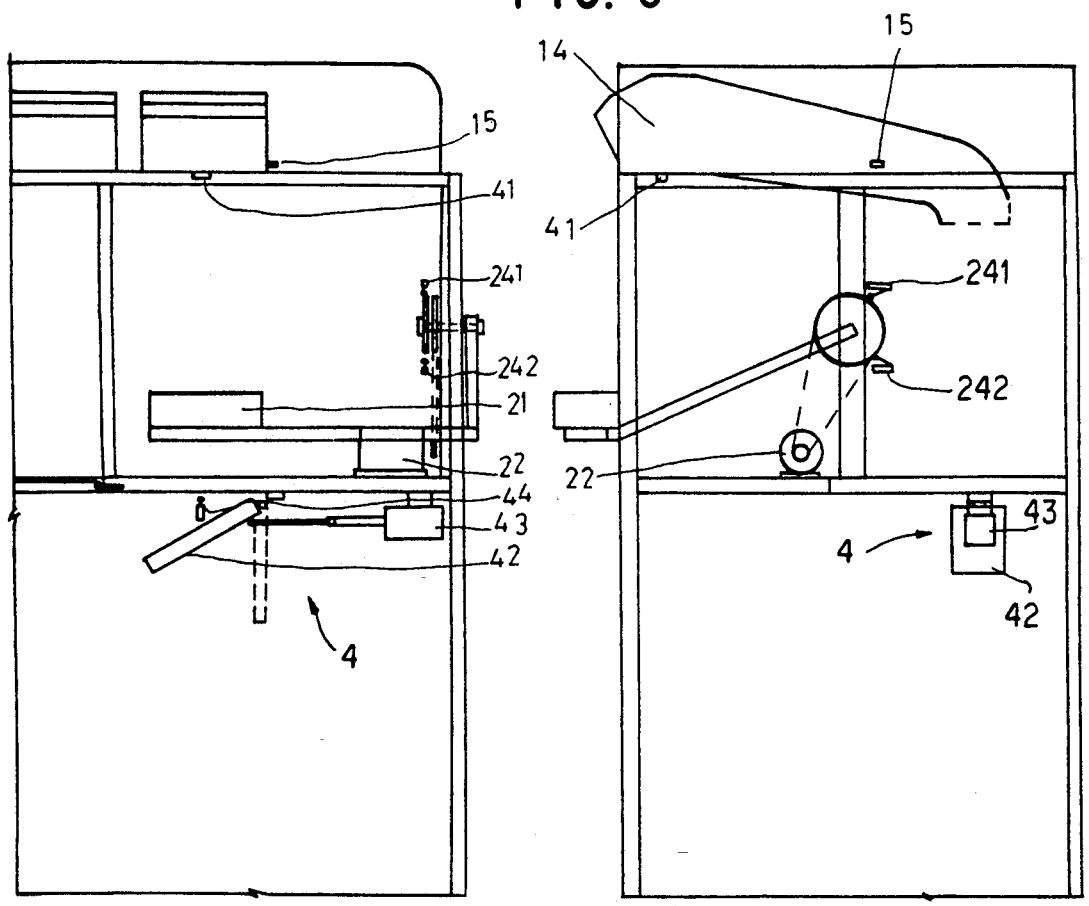
FIG. 7 is a fragmentary front view showing the right side only of the device of FIG. 6 with the front housing removed and the roller ramming mechanism removed.
FIG. 8 is a side view of the FIG. 7 with the side housing wall removed and with the roller ramming mechanism removed.

Referring to the annexed drawings in greater detail, the preferred embodiment of the waste collecting machine of the present invention is generally comprised of a housing 1, a mechanical arm 2, a roller ramming mechanism 3, and a waste material classifier 4.

The housing 1 has a first entrance 11 for waste glass bottles, a second entrance 12 for waste, non-glass cans, a first slide way 13 connected to said first entrance 11, a second slide way 14 connected to said second entrance 12, a photo-sensor 15 set in said second slide way 14 at one side, red, yellow and green indicator lamps 161, 162 and 163 at the front for functional indication, a plurality of dustbins 17 connected thereto at the outside, and a drain port 18 at the bottom.

The mechanical arm 2 has a box 21 attached thereto at the front end thereof and driven by a motor 22 to move in a predetermined course by means of the control of a start switch 23. Two micro-switches 241 and 242 are respectively made on the housing 1 at two opposite locations to confine the upper and lower limits of the moving range of the mechanical arm 2.

The roller ramming mechanism 3 comprises a motor 31 to drive a plurality of chains 32 to carry a plurality of chain wheel 33 to rotate, so as to further drive four pairs of rollers 34 to relatively rotate in reverse direction by means of the operation of a plurality of spur gears 35. The four pairs of rollers 34 are respectively arranged in two lines. When the four rollers at the first line are driven to rotate clockwise direction, the four rollers at the second line are driven to rotate in counter-clockwise direction. Therefore, waste containers delivered to the roller ramming mechanism 3 between the two lines of rollers will be immediately crushed into flat shape. Further, there is provided an adjusting screw 38 coupled with a spring 37 to control the position of a slide block 36 which is attached to the lowest pair of rollers 34 at one side for regulating the gap between the rollers 34.

The waste material classifier 4 comprises a metal detector 41 set in the second slide way 14 at the bottom for detecting waste metal material, a sub-slide way 42 disposed at the bottom of the roller ramming mechanism 3, a micro-switch 44 set in said sub-slide way 42 at the top for counting control, an electromagnet 43 set in said sub-slide way at one side, and a coin refund control device 45 set inside the housing 1 at the middle.

When non-glass type of waste cans are inserted through the second entrance 12 into the second slide way 14 toward the rollers 34, the photo-sensor 15 is triggered to drive the reducer motor 31 to carry the rollers 34 to rotate so as to crush waste cans into flat shape. After having been squeezed out of shape, crushed waste cans drop into the sub-slide way 42. When there is any waste bottle or can dropping into the sub-slide way 42, the metal detector 41 is simultaneously triggered to make a judgment so as to drive the electromagnet 43 to attract the sub-slide way 42 to the left, when detected waste bottle or can is a metal object, permitting the waste bottle or can to fall into the receiving chamber at the left side. If the waste bottle or can is a non-metal object, the sub-slide way 42 remains immovable so that the waste bottle or can is guided to drop into a receiving chamber at the right side. The micro-switch 44 in the sub-slide way 42 is simultaneously triggered to count the number of cans or bottles passing therethrough so as to further drive the coin refund control device 45 to give out coins according to the quantity of cans or bottles counted.

The mechanical arm 2 is provided to help young children to send waste bottles or cans into the entrance 12 by means of the box 21 thereof.

The slide block 36, spring 37 and adjusting screw 38 are incorporated together for regulating the gap between the two lines of rollers 34. There is also provided an overload protection device to automatically cut off power supply to the reducer motor 31 so as to protect the reducer motor 31 from damage due to overload. Under overload protection mode, the red indicator lamp 161 is turned on for indication (yellow indicator lamp 162 indicates that the machine is under operation; green indicator lamp 163 indicates that the machine is normal). During the operation of the roller ramming mechanism, waste water from waste cans or bottles is guided to drain out of the machine through the drain port 18. The dustbins 17 are provided for collecting special waste objects or for use in an emergency when the receiving chambers inside the machine are fully occupied.

What is claimed is:

1. A waste collecting machine, comprising:

a housing having at the top on the front panel thereof a first entrance for waste bottles and a second entrance for waste metal cans, a first slide way connected to said first entrance, a second slide way connected to said second entrance, photo-sensor means cooperable with said second slide way for detecting when an object passes therethrough, a red indicator lamp for damage indication, a yellow indicator lamp for indication of under operation, a green indicator lamp for normal function indication mounted on the front panel of said housing, a plurality of dustbins connected thereto, and a drain port at the bottom of said housing for discharging wastewater therein;

a mechanical arm pivotably mounted on said housing and having a box at the front end thereof and a motor coupled thereto to move said arm in a predetermined arc a control switch for actuating said motor, two micro-switches mounted on said housing to confine movement of said arm within an upper and a lower limit for sending waste objects in said box into said second entrance;

a roller ramming mechanism mounted in said housing comprising a reducer motor, a plurality of chains, and a plurality of chain wheels coupled thereto to rotate and two opposed sets of rollers also coupled thereto adapted to rotate in opposite directions for squeezing waste metal objects and a plurality of spur gears respectively mounted on each set of rollers and engaged with one another, and pitch regulating means coupled thereto including an adjusting screw coupled with a spring and a slide block attached to said rollers for regulating the gap between the two opposed sets of rollers;

waste material classifier means comprising a metal detector set in said second slide way at the bottom for detecting waste metal objects passing thereby, a sub-slide way disposed at the bottom of said roller ramming mechanism, a micro-switch set in said sub-slide way at the top for counting control, an electromagnet set in said sub-slide way at one side, and a coin refund control means set inside said housing at the middle for refunding coins; and wherein said metal detector drives said electromagnet to drive said sub-slide way to the left upon detection of a waste metal object passing thereby, so as to let the waste metal object to drop into a receiving chamber at the left side inside said housing; said electromagnet working only when metal objects are detected, so that said sub-slide way remains normally immovable permitting non-metal, waste objects to drop into a receiving chamber at the right side of said housing; the micro-switch in said sub-slide way being provided to count the number of waste objects passing thereby so as to trigger said coin refund control device to dispense coins in return for the waste objects received.

* * * * *